Aug. 27, 1957  D. L. STONE  2,804,105
FRAME CONSTRUCTION FOR RIM-DRIVEN CIRCULAR SAWS
Filed March 30, 1956  2 Sheets-Sheet 1

INVENTOR.
DEWEY L. STONE
BY
McMorrow, Berman & Davidson
ATTORNEYS

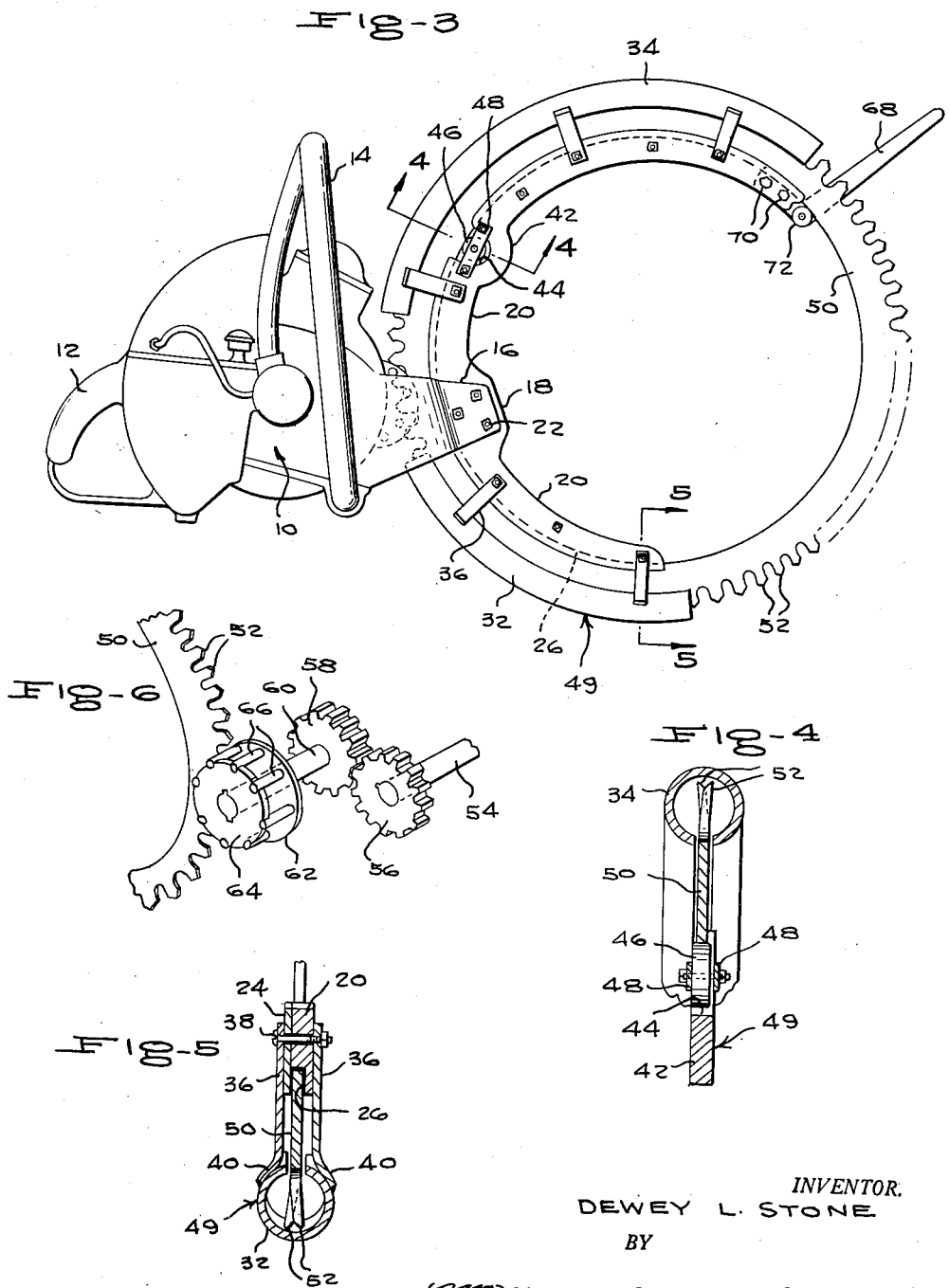

United States Patent Office 2,804,105
Patented Aug. 27, 1957

2,804,105

FRAME CONSTRUCTION FOR RIM-DRIVEN, CIRCULAR SAWS

Dewey L. Stone, Chattanooga, Tenn.

Application March 30, 1956, Serial No. 575,195

3 Claims. (Cl. 143—44)

This invention relates generally to power saws, and more particularly has reference to a power saw that can be briefly summarized as follows: a motor, which can be of the type normally used for driving circular or chain saws, is adapted to drive a sprocket, and said sprocket is in direct mesh with the teeth of an annular saw blade, mounted to turn on an arcuate saw blade support frame carried by the motor. Arcuate guards are mounted upon the frame, to enclose the cutting edge of the saw blade through part of the circumference of the saw blade, at locations selected for the protection of the user. Projecting outwardly from one end of the frame is a bumper, adapted to bear against a tree during the traverse of the blade through the same. To reduce friction between the blade and its associated frame to a minimum, the frame is provided with angularly spaced rollers in engagement with the inner periphery of the saw blade.

Most usually, power saws employed for the purpose of falling trees or for bucking logs are of the chain saw type, or of the type utilizing reciprocating blades or solid center circular blades.

Certain disadvantages have been noted in connection with devices of this type. For example, in many instances the saw blade frame and blade can be associated only with a particular motor, so that the adaptability of the frame and blade for attachment to any of a plurality of motors does not exist. Further, in many instances the means for transmitting drive from the motor to the saw blade is relatively complex, adding to the weight and expense of the saw and involving, in many instances, the absolute necessity of two-man operation, thereby adding a labor cost which, if possible, should be avoided.

In view of the above noted characteristics of power saws already in use for the general purposes previously stated herein, one important object of the present invention is to provide a ring saw including an annular saw blade and an associated frame, with the blade and frame being so designed as to be connectable to any of various makes and models of light, one-man power saw motors presently on the market, thus to reduce considerably the cost of manufacture and thus, further, to facilitate interchange of the saw blades without requirement of designing a special motor therefor.

Another object is to provide a saw as described which will be particularly designed to be of specially light weight in relation to the work which the saw is capable of performing, thus to permit it to be readily carried about and operated by one man on any type of terrain.

Another object is to provide a device as stated which will consist of a minimum of parts, thus to permit the manufacture of the same at a correspondingly low cost, the cost being thus adapted to be reduced below that required for the manufacture of other saws the performance level of which is no greater than that of the saw constituting the invention.

Yet another object is to provide a ring saw wherein the relatively low cost of the same and the simplicity of operation derives from a combination of an annular, as distinguished from a solid center, saw blade with a drive means directly meshing with the teeth of the saw blade. By reason of this arrangement, wherein an open center saw blade is utilized reducing friction as the blade moves through the tree or log, and wherein, further, the blade is driven directly from the shaft of a sprocket in mesh with the blade, heavy driving connections, are not required. Such heavy driving connections have generally been required, heretofore, to offset the friction encountered as the blade moves through the trees and must also be sufficiently heavy to drive the heavy saw chain or solid center blade.

Still another object is to provide a saw which is particularly designed to allow its attachment to motors that operate in any position, therefore rendering unnecessary swivel devices or other means effecting a relatively movable connection between the motor and the saw.

Still another object is to provide a ring saw attachment for power or chain saw motors that will require a relatively small space within which it will clear itself, as distinguished from other saws previously devised for the same purpose.

Other objects will appear from the following description, the claims appended thereto, and from the annexed drawings in which like reference characters designate like parts throughout the several views and wherein:

Figure 3 is a side elevational view of the ring saw, showing the side opposite that seen in Figure 1;

Figure 4 is an enlarged, detail sectional view through the frame and blade on line 4—4 of Figure 3;

Figure 5 is an enlarged, detail sectional view on line 5—5 of Figure 3; and

Figure 6 is a fragmentary perspective view of the blade and the associated drive means.

Figure 1:
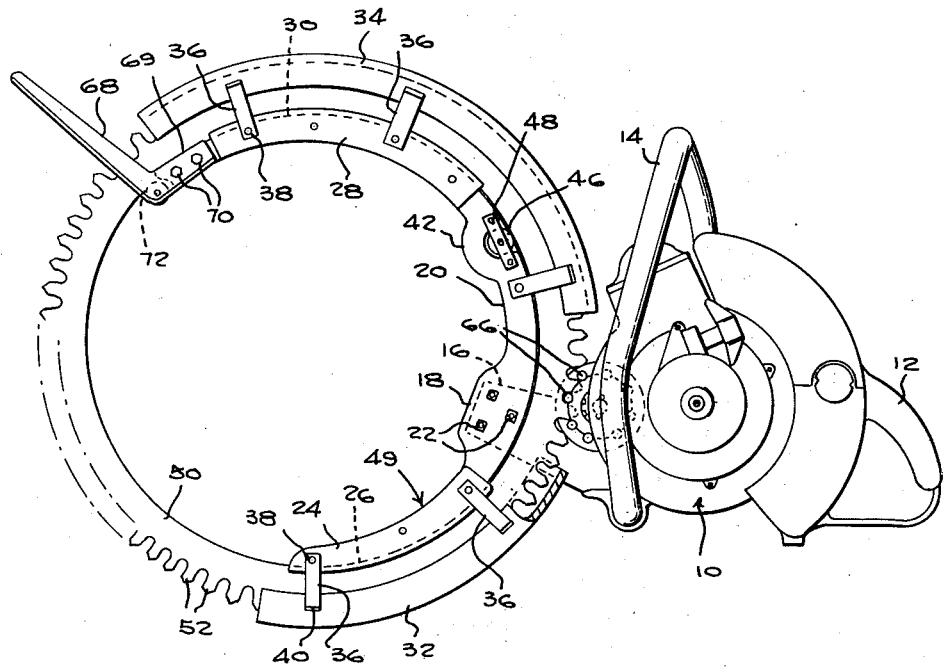
Figure 1 is a side elevational view of a ring saw formed according to the present invention.
Figure 2:
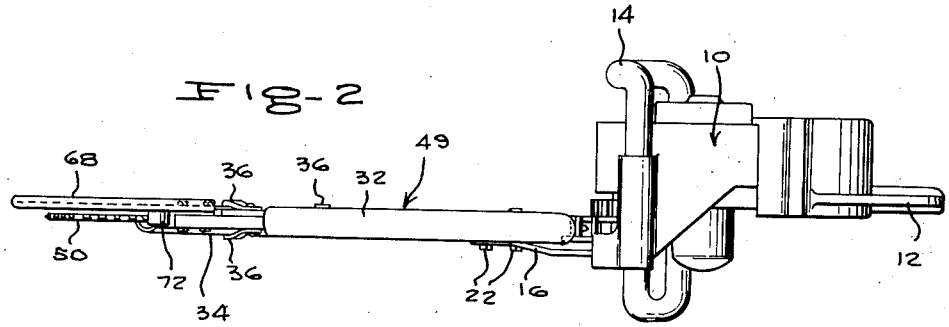
Figure 2 is a top plan view thereof.

Referring to the drawings in detail, designated generally at 10 is a motor for a power saw, having a first handle 12 and a second handle 14. The motor illustrated is per se conventional, and one important feature of the invention, as will presently appear, resides in its adaptability for attachment to any of various motors, the motor shown being merely illustrative of one of many to which the device can be connected.

Fixedly secured and projecting forwardly from the housing of the motor at one side thereof is a frame support plate 16, in face-to-face contact at its outer, free end with the transversely enlarged intermediate portion 18 of an elongated, arcuate, flat main frame member 20 extending, as shown in Figure 3, through slightly more than one-hundred eighty degrees of a circle. In the illustrated embodiment, the member 20 extends through approximately two-hundred and twenty five degrees of a full circle, but the particular length of the frame member can be varied as desired by the manufacturer.

The transversely enlarged portion 18 is secured by a plurality of bolts 22 to the frame support plate 16 of the motor, and extending from the enlargement 18 to the adjacent end of the member 20 is an arcuate guide plate 24. Referring to Figure 5, member 20 has a recess of angular cross section extending the full length of the convexed or outer edge of member 20, and guide plate 24 provides a wall for the open side of the recess so as to cooperate with member 20 in defining an outwardly facing channel 26 for the saw blade.

A second guide plate 28 is secured to the opposite end portion of the member 20, and is formed and attached similarly to the guide plate 24, so as to provide, at said other end of the member 20, a guide channel 30 for the saw blade.

To protect the user, there are provided arcuate guards 32, 34 formed as shown in Figure 5 as split tubular elements. These are concentric with the member 20 and guide plates, and are spaced outwardly therefrom so as to protectively house the toothed outer periphery of the saw blade. The guards are secured in the desired relationship to the member 20 and guide plates by means of radial connecting strips 36.

The connecting strips are arranged in pairs, with the strips of each pair being aligned transversely of the guard. At their outer ends, the connecting strips have divergent portions 40 (Figure 5) welded to opposite sides of their associated guards, and at their inner ends, the connecting strips are apertured for extension of connecting bolts 38 therethrough, the connecting bolts passing also through openings formed in the guide plates and main frame member 20.

Adjacent the inner end of the guide plate 28, member 28 has a widened part 42 (Figures 1 and 4) formed at the outer edge of the member 20 with an arcuate recess 44 in which is rotatably mounted a bearing roller 46, carried by an axle or pin extending between bearing plates 48 secured to opposite faces of the member 20.

The parts of the invention designated from 20 to 48 inclusive may appropriately be considered as a blade support frame generally designated by the reference numeral 49, fixedly connectable through the medium of the frame support plate 16 to a motor 10 that is conventional per se.

The saw blade of the device has been designated at 50, and comprises an endless, annular blade member lying in the plane of the member 20 and having its inner periphery riding in the guide channels 26, 30. Since the frame 49 extends through only a substantial part of the circumference of the ring saw as shown in Figure 1, the exposed part of the blade is adapted to enter the tree or log for the purpose of cutting the same.

At its outer periphery, the blade is integrally formed with teeth 52, and these can be shaped as desired for the particular sawing function to be performed. Thus, as shown in Figure 4, the teeth 52 can be inclined slightly out of the plane of the saw blade body, with alternating teeth being oppositely inclined as shown in Figure 4. In each instance, however, there is a space between adjacent teeth, for the purpose of receiving the pins of a drive sprocket in a manner to be presently made apparent.

The shaft of the motor has been designated at 54 (Figure 6), and keyed or otherwise secured thereto is a drive gear 56 in mesh with a driven gear 58, secured to a sprocket shaft 60 parallel to the shaft 54. Secured to the outer end of the sprocket shaft 60 for rotation therewith is a saw blade drive sprocket including plates 62, 64 spaced axially of the shaft 60. A circumferential series of pins 66, each of which parallels the sprocket drive shaft 60, is provided upon the periphery of the sprocket, the pins 66 at one end being engaged in marginal openings provided in the plate 62, and at their other ends being fixedly engaged in a circumferential series of recesses formed in the periphery of the plate 64.

The pins 66 are in mesh with the teeth 52, as shown to best advantage in Figures 1 and 6. Accordingly, on operation of the motor, the teeth of the blade will constitute gear teeth, in mesh with and directly driven from a sprocket. This eliminates various types of transmissions hereinbefore employed, which tend to add weight and cost to the machine. The arrangement is particularly desirable in combination with the use of an annular, open center saw blade, since the relatively light driving connection between the motor and blade is made possible through the use of an open center saw blade that is itself of light construction and has minimum friction with the tree or log being cut.

At one end of the frame 49, there is provided a radially, outwardly extending bumper 68 in the form of an elongated bar, having at its inner end a lateral extension 69 (Figure 1) secured by bolts 70 or the like to the member 20 in closely spaced relation to the outer end of the guide plate 28. Rotatably mounted upon the bumper 68 at the juncture of the angularly related portions thereof is a bearing roller 72 cooperating with the roller 46 in rotatably supporting the annular saw blade upon the frame 49. This reduces friction between the saw blade and the frame to a minimum, to allow free running of the blade.

The bumper, of course, is adapted to engage against the timber being cut to provide a stop or rest about which the blade structure may pivot when traversing said timber.

In actual use of a full size working model, it has been found that the ring saw operates with full efficiency, in falling trees up to eighteen inches in diameter, despite the fact that the overall weight of the motor may be as little as eighteen pounds. The device is adapted for mounting on any of a plurality of motors readily obtained on the open market, weighing anywhere from eighteen to twenty-eight pounds. The device can be operated by one man and can be readily moved about in mountainous or hilly terrain, and is adapted for efficient operation not only in the falling of timber, but also in bucking logs and in other timber cutting operations.

Still further, it has been found in practice that since the device is made for motors that operate in any position, it is unnecessary to have a swivel connection between the motor and the frame.

The device can, of course, be made in any size, and the teeth can be shaped to any cutting need and can also be of any desired size. In certain instances, the sprocket used with one saw blade might necessarily require removal when another saw blade is to be used, it being merely necessary that each sprocket match or properly mesh with the teeth of the particular saw blade with which a specific cutting operation is to be performed.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a rim-driven power saw of the type that includes an annular, toothed blade, a drive element for the blade having teeth meshing with the teeth of the blade for rotating the blade, and a motor having a driving connection to said drive element, an improved frame construction comprising: a frame support plate secured to and projecting from said motor; elongated, arcuate, flat, main frame means fixedly secured to said frame support plate and extending concentrically with the blade along the inside edge of the blade, said main frame means having in its outside edge a longitudinal guide channel closed at its bottom and receiving the inside edge of the blade to guide the blade during rotation thereof, the main frame means having at locations spaced longitudinally thereof recesses interrupting the continuity of and opening into the channel; guide rollers journalled in said recesses and extending into the channel to peripherally contact the inside edge of the blade; an arcuate guard in the form of a split tube opening toward the channel and extending concentrically to the blade in position to receive the outside edge of the blade, said guard being wholly out of contact with the blade; and connecting means angularly spaced about the blade circumference and connecting the guard and main frame means in position to receive the outside and inside edges, respectively, of the blade.

2. In a rim-driven power saw of the type that includes an annular, toothed blade, a drive element for the blade having teeth meshing with the teeth of the blade for rotating the blade, and a motor having a driving connection to said drive element, an improved frame construction comprising: a frame support plate secured to and projecting from said motor; elongated, arcuate, flat, main frame means fixedly secured to said frame support plate and extending concentrically with the blade along the inside edge of the blade, said main frame means having in its outside edge a longitudinal guide channel closed at its bottom and receiving the inside edge of the blade to guide the blade during rotation thereof, the main frame means having at locations spaced longitudinally thereof recesses interrupting the continuity of and opening into the channel; guide rollers journalled in said recesses and extending into the channel to peripherally contact the inside edge of the blade; an arcuate guard in the form of a split tube opening toward the channel and extending concentrically to the blade in position to receive the outside edge of the blade, said guard being wholly out of contact with the blade; and connecting means angularly spaced about the blade circumference and connecting the guard and main frame means in position to receive the outside and inside edges, respectively, of the blade, said main frame means comprising a main frame member one side of which is formed with an angular recess opening upon the outside edge and one side surface of the main frame member, the main frame means further including at least one guide plate fixedly secured to said side of the main frame member and closing that side of the recess that opens upon said one side surface of the main frame member, thus cooperating with the main frame member in defining the channel.

3. In a rim-driven power saw of the type that includes an annular, toothed blade, a drive element for the blade having teeth meshing with the teeth of the blade for rotating the blade, and a motor having a driving connection to said drive element, an improved frame construction comprising: a frame support plate secured to and projecting from said motor; elongated, arcuate, flat, main frame means fixedly secured to said frame support plate and extending concentrically with the blade along the inside edge of the blade, said main frame means having in its outside edge a longitudinal guide channel closed at its bottom and receiving the inside edge of the blade to guide the blade during rotation thereof, the main frame means having at locations spaced longitudinally thereof recesses interrupting the continuity of and opening into the channel; guide rollers journalled in said recesses and extending into the channel to peripherally contact the inside edge of the blade; an arcuate guard in the form of a split tube opening toward the channel and extending concentrically to the blade in position to receive the outside edge of the blade, said guard being wholly out of contact with the blade; and connecting means angularly spaced about the blade circumference and connecting the guard and main frame means in position to receive the outside and inside edges, respectively, of the blade, said connecting means comprising pairs of connector members, said connector members being bolted at one end to the main frame means and projecting radially upwardly from the main frame means, the connector members of each pair at their other ends diverging to receive the tube, said divergent, other ends of the connecting members being welded to the tube.

References Cited in the file of this patent
UNITED STATES PATENTS

| | | |
|---|---|---|
| 460,679 | Hammond | Oct. 6, 1891 |
| 1,179,910 | Greenfield | Apr. 18, 1916 |
| 2,572,065 | Smith | Oct. 23, 1951 |
| 2,701,590 | Barker | Feb. 8, 1955 |
| 2,770,036 | Anderson | Nov. 13, 1956 |